April 3, 1973  T. B. McDONOUGH  3,725,155
METHOD OF PREPARING FULMINATING MATERIAL FOR PHOTOFLASH LAMP
Original Filed Nov. 20, 1970
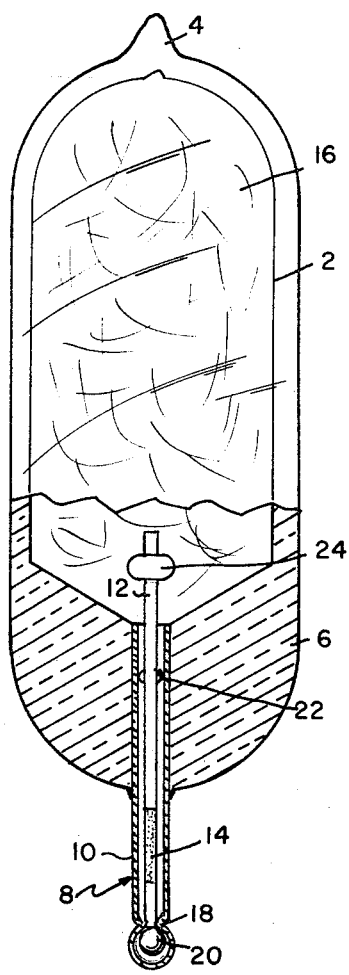

United States Patent Office 3,725,155
Patented Apr. 3, 1973

3,725,155
METHOD OF PREPARING FULMINATING MATERIAL FOR PHOTOFLASH LAMP
Thomas B. McDonough, Allenwood, Pa., assignor to Sylvania Electric Products Inc.
Original application Nov. 20, 1970, Ser. No. 91,252. Divided and this application Nov. 22, 1971, Ser. No. 201,226
Int. Cl. C06f 3/06
U.S. Cl. 149—31                    6 Claims

ABSTRACT OF THE DISCLOSURE

A percussive-type photoflash lamp having a primer of the type comprising a wire anvil partially coated with fulminating material and coaxially supported within a tube in a manner providing a clearance between the coating of fulminating material and the inner wall of the tube. The fulminating material contains sodium chlorate as the oxidizer and is prepared by mixing an aqueous slurry containing red phosphorus with an aqueous solution of dissolved sodium chlorate.

---

This is a division of application Ser. No. 91,252, filed Nov. 20, 1970.

This invention relates to the manufacture of percussive-type photoflash lamps and more particularly to the composition and method of preparing the charge of fulminating material employed therewith.

Generally speaking, a percussive-type photoflash lamp comprises an hermetically sealed, light-transmitting envelope containing a source of actinic light and having a primer secured thereto. More particularly, the percussive-type photoflash lamp comprises a length of glass tubing constricted to a tip at one end thereof and having a primer sealed therein at the other end thereof. The length of glass tubing which defines the lamp envelope contains a combustible, such as shredded zirconium foil, and a combustion supporting gas, such as oxygen. The primer comprises a metal tube and a charge of fulminating material on a wire anvil coaxially supported therein. Operation of the lamp is initiated by an impact onto the tube of the primer to cause deflagration of the fulminating material on the wire anvil up through the tube to ignite the combustible disposed in the lamp envelope.

Previous impact-sensitive fulminating materials for percussive flashlamps employed potassium chlorate as the oxidizer. The amount of potassium chlorate required in workable formulations exceeded the solubility of the oxidizer in the quantity of water used. The resultant saturated solution of oxidizer promoted crystal growth, both in the separately prepared oxidizer component as well as in finished pastes of fulminating material. The addition of sufficient water to dissolve all of the potassium chlorate would produce fluids with such low solids content that application of sufficient quantities of fulminating material, onto the primer anvil wire would be impractical on a production basis.

Crystal growth of the oxidizer is deleterious in this application as only several thousandths of an inch clearance exits between the anvil wire and the tube within which it is coaxially supported. The thickness of the fulminating material protruding only a few thousandths about 0.002" to 0.003". A lump on the surface of the fulminating material protruding only a few thousandths of an inch may cause contact between the impact and abrasion-sensitive coating on the anvil wire and the wall of the surrounding tube. Mechanical shock or vibration causes deflagration of coating wherein such contact occurs.

An additional disadvantage in using potassium chlorate is that it must be milled to obtain a particle size of several microns diameter. Particles of a couple of thousandths inch diameter increase the coating thickness of the fulminating material and increase the danger of inadvertent ignition from tube-to-coating contact.

The usual technique employed in the preparation of impact-sensitive fulminating material is to blend all components except the oxidizer. A separate paste of oxidizer is prepared and mixed with the other components to produce the finished fulminating material just before use. The paste of potassium chlorate oxidizer suffers crystal growth atfer three to four weeks storage. This crystal growth is a cause for rejection of the batch, and the material is wasted.

One additional disadvantage to the use of the potassium chlorate is that the mixed fulminating material paste will run only about two hours on the production equipment before crystal growth begins to take place. This makes it necessary to remove and discard the fluid left at two-hour intervals. In addition, the dispensing devices must be thoroughly cleansed before refilling with fresh fulminating material paste. Up to fifty percent of the paste produced is dicarded because of this crystallization.

In view of the foregoing, the principal object of this invention is to provide a paste of fulminating material, for the primer of a percussive-type photoflash lamp, which remains free of crystal growth during storage and use. Another object is to provide a more reliable percussive-type photoflash lamp. Another object is to provide an oxidizer component which may be prepared by dissolving a chlorate salt in water and which does not suffer crystal formation either before or after admixture with the other components of the fulminating material. A further object of the invention is to provide an improved method of preparing fulminating material in which a chlorate salt is dissolved in water to provide the oxidizer component, rather than by grinding or milling in aqueous media.

I have found that these objects can be achieved by the use of sodium chlorate as the oxidizer instead of potassium chlorate. In accordance with the invention, sodium chlorate, which is over seven times as water soluble as potassium chlorate, is completely dissolved in both the oxidizer component and the finished paste. Because sodium chlorate forms non-saturated solutions in workable formulations of oxidizer component and finished fluid, it will not crystallize and thereby permits long-term storage. Finished fluids of fulminating material using sodium chlorate can be used up to sixteen hours on production equipment without crystal formation, as compared to the two-hour limit of potassium chlorate oxidized compositions. This fact results in significant cost savings, as almost all of the fulminating material produced may be utilized without the need for rejection caused by crystal growth.

Potassium chlorate is usually preferred for use in fulminating materials as it is non-hygroscopic. Sodium chlorate is hygroscopic and, as such, loses sensitivity in formulations of fulminating material which are exposed to air. In addition, the water absorbed may cause decomposition of the other materials comprising the fulminating material. However, sodium chlorate can be used to advantage in the fulminating material for percussive flashlamps as the hermetically sealed structure of such lamps provides a dry atmosphere.

By way of specific example, the paste composition of an impact sensitive fulminating material according to the invention may comprise: 49.66% water, 28.46% titanium, 10.36% red phosphorus, 8.55% sodium chlorate, 1.85% hydroxyethyl cellulose, 0.73% sodium lignin sulfonate, 0.28% magnesium oxide, 0.05% sodium 2-ethylhexyl sulfate, 0.03% sulfur, and 0.03% trichlorophenol.

The paste, when dried, constitutes the impact-sensitive fulminating material. Of course, the invention is not limited to the quantities indicated, and additions, deletions or variations in composition may be made to suit given applications and sensitivty requrements. For example, the burning behavior of the dried residue varies greatly with the concentration of sodium chlorate used. Below about 5% sodium chlorate in the paste, impact sensitivity falls off rapidly, whereas a composition with over 50% sodium chlorate results in a charge which burns violently and yields a decreased light output from the flashlamp.

Other chlorate salts which have cations not catalytically reactive toward red phosphorus and which are soluble to the extent of 15% or greater by weight in water may be used; for example, calcium chlorate, lithium chlorate, magnesium chlorate, aluminum chlorate, and zinc chlorate. However, the extreme deliquescence of these materials may render their use in flashlamps more difficult with regard to drying and maintaining the coating dry prior to hermetic closure of he flashlamp. Similarly, phosphorus sesquisulfide may be used in place of red phosphorus, if desired, although a slight loss in sensitivity may be noted. Also, zirconium or boron may be substituted for titanium.

The method of preparing the above described fulminating material paste according to the invention comprises: (1) blending all of the denoted materials, except the chlorate, with some of the water to provide an aqueous slurry containing the phosphorus and titanium, etc.; (2) dissolving the chlorate in water to provide an aqueous solution thereof; and (3) mixing the phosphorus slurry and chlorate solution together. The aqueous slurry or red phosphorus, etc., and the oxidizer solution are stored separately and, in the interest of safety, are blended together just before use. Either of the components is relatively safe, even when dry; but when combined and dried, the resultant material burns on impact or abrasion.

In the accompanying drawing, the single figure is a sectional elevational view of a percussive-type photoflash lamp with which a charge of fulminating prepared in accordance with this invention may be employed. The lamp comprises a length of glass tubing defining an hermetically sealed lamp envelope 2 constricted at one end to define an exhaust tip 4 and shaped to define a seal 6 about a primer 8 at the other end thereof. The primer 8 comprises a metal tube 10 and a wire anvil 12 coated with a charge of fulminating material 14. A combustible such as filamentary zirconium 16 and a combustion-supporting gas such as oxygen are disposed within the lamp envelope. The wire anvil 12 is centered within the tube 10 and held in place by a crimp 18 just above the head 20 of the anvil. Additional means, such as lobes 22 on wire anvil 12, are also used to aid in stabilizing and supporting it substantially coaxial within the primer tube 10 and ensuring clearance between the fulminating material 14 and the inside wall of the tube 10. A refractory bead 24, fused to the wire anvil 12 just above the inner mouth of the primer tube 10, eliminates burn-throughs and functions as a deflector to deflect and control the ejection of hot particles of fulminating material from the primer tube.

In conclusion, the present invention provides an oxidizer component which remains free from crystal growth both as prepared and in the finished fulminating material paste. The oxidizer component is readily prepared by dissolution of the chlorate salt in water. The resultant coatings of fulminating material 14 on anvil 12 are uniform, smooth and lump-free even after the paste has run on production equipment for sixteen hours. Such smooth coatings help maintain sufficient clearance between the fulminating material 14 and the tube 10 wall so that inadvertent lamp ignitions from scuffed primer are prevented. The coating uniformity ensures high reliability of deflagration upon impact and minimizes inadvertent lamp ignition.

What is claimed is:

1. The method of preparing a fulminating material, including a phosphorus and a chlorate soluble to the extent of 15% or greater by weight in water, for use in photoflash lamps, said method comprising, preparing the phosphorus as an aqueous slurry, dissolving said chlorate in water to provide an aqueous solution thereof, and mixing said phosphorus slurry and chlorate solution.

2. The method of claim 1 in which said chlorate is sodium chlorate.

3. The method of claim 2 in which said phosphorus is red phosphorus.

4. The method of claim 3 in which said aqueous slurry of red phosphorus also contains titanium.

5. The method of claim 4 in which said aqueous slurry is prepared by mixing the following components in water: red phosphorus, titanium, hydroxyethyl cellulose, sodium lignin sulfonate, magnesium oxide, sodium 2-ethylhexyl sulfate, sulfur and trichlorophenol.

6. The method of claim 5 in which the mixing of said slurry and said solution forms a paste comprising about 49.66% water, about 28.46% titanium, about 10.36% red phosphorus, about 8.55% sodium chlorate, about 1.85% hydroxyethylcellulose, about 0.73% sodium lignin sulfonate, about 0.28% magnesium oxide, about 0.05% sodium 2 - ethylhexyl sulfate, about 0.03% sulfur, and about 0.03% trichlorophenol.

References Cited

UNITED STATES PATENTS

| | | | |
|---|---|---|---|
| 779,674 | 1/1905 | Staier | 149—31 |
| 1,329,537 | 2/1920 | Mardick | 149—31 |

STEPHEN J. LECHERT JR., Primary Examiner

U.S. Cl. X.R.

149—40, 42, 44, 82, 85; 431—92